(12) United States Patent
Reich et al.

(10) Patent No.: US 12,706,771 B2
(45) Date of Patent: Aug. 11, 2026

(54) DATA HUB POWERED BY A DEVICE CONNECTED THERETO

(71) Applicant: SOMFY SYSTEMS INC., Dayton, NJ (US)

(72) Inventors: Tyler Reich, Dayton, NJ (US); Ty Saville, Dayton, NJ (US); Corey Barnwell, Dayton, NJ (US); John Kain, Dayton, NJ (US); Michael Pearce, Dayton, NJ (US); Rahul Goradia, Dayton, NJ (US)

(73) Assignee: SOMFY SYSTEMS INC., Dayton, NJ (US)

( * ) Notice: Subject to any disclaimer, the term of this patent is extended or adjusted under 35 U.S.C. 154(b) by 164 days.

(21) Appl. No.: 18/525,905

(22) Filed: Dec. 1, 2023

(65) Prior Publication Data

US 2025/0183662 A1 Jun. 5, 2025

(51) Int. Cl.

| | |
|---|---|
| ***H04L 12/28*** | (2006.01) |
| ***E06B 9/68*** | (2006.01) |
| *H02J 3/007* | (2026.01) |

(52) U.S. Cl.

CPC ............ *H04L 12/2803* (2013.01); *E06B 9/68* (2013.01); *H02J 3/007* (2020.01)

(58) Field of Classification Search

CPC ......... H04L 12/2803; E06B 9/68; H02J 3/007

See application file for complete search history.

(56) References Cited

U.S. PATENT DOCUMENTS

| | | | | |
|---|---|---|---|---|
| 6,690,277 | B1 * | 2/2004 | Hansen | G08B 13/1454 340/568.2 |
| 8,612,056 | B2 | 12/2013 | Klasson et al. | |
| 11,374,784 | B2 | 6/2022 | Fargier | |
| 2017/0356243 | A1 * | 12/2017 | Feldstein | H02J 7/0024 |
| 2018/0249556 | A1 * | 8/2018 | Wendt | H02J 9/02 |

* cited by examiner

*Primary Examiner* — Daniel Cavallari

(74) *Attorney, Agent, or Firm* — Carmel Patent Agency; Robert Ballarini

(57) ABSTRACT

A data hub of a home automation system is powered by a power supply of at least one powered device of the home automation system that is connected to the data hub. By providing power to the data hub from the one of the devices that are connected to it, the need for a separate power source is eliminated. A method for powering a data hub of a home-automation system without bus power includes connecting at least two independently powered devices to device ports of the data hub. When the powered devices are connected to the ports, a voltage is detected by an internal power regulation, protection and distribution unit of the hub and disconnects bus power. A system for powering the data hub includes configuring the hub to receive power by devices connected thereto. When the hub receives power from the powered device, bus power is disconnected.

12 Claims, 6 Drawing Sheets

DATA HUB POWERED BY A DEVICE CONNECTED THERETO

FIELD OF THE INVENTION

The present disclosure is directed to the field of building or home automation installations, i.e., to the field of controllers for motorized solar screens, shades, shutters, etc. In particular, the disclosure deals with a data hub, which is powered by actuator motors of the solar screens, and which in turn powers a keypad controller.

BACKGROUND

Many homes and commercial buildings are currently equipped with devices for controlling lighting, ventilation etc. In many of these buildings shutters or rolling blinds are placed in front of windows and are controlled by the occupants from keypads that are connected to data hubs which are in turn connected to actuators that control the opening and closing of the shutters or rolling blinds. An example of keypad controllers, which are used to interface with the actuators is known by the trade name "DecoFlex", produced by the Applicant.

Data bus hubs are used to hardwire multiple cables from the actuators to controllers. The hubs accept CAT5 or CAT6 cable with RJ45 plugs on the ends. Such hubs require an external power source and are generally located in plenums or air spaces or electrical closets of buildings. It is often cumbersome and adds additional expense to run cable to specifically power them. Data hubs are traditionally powered only by a point of entry injector, i.e., a bus power supply. This arrangement has drawbacks since as the data hubs get further and further from the location of the power supply, power losses in the cable increase. Depending on the distances and the number of devices connected, the devices towards the end of the bus may fail to operate as the voltage drops too low. Considering this in the design process makes designing a bus that will work properly rather difficult. A typical installation in the field of home automation is described in published patent application number US 2011184561.

It is known to proceed to the configuration, the control and/or supervision of said installation by using a central control unit that communicates with at least one home automation device. RS-485 is an industrial specification that defines the electrical interface and physical layer for point-to-point communication of electrical devices. The RS-485 standard allows for long cabling distances (approximatively 50-100 m) in electrically noisy environments and can support multiple devices on the same bus. A data bus is a system within a computer or device, comprising a connector or set of wires, that provides transportation for data.

Typically, the equipment items are connected to a control unit which is used to supervise equipment and control their operation. The equipment is connected directly to the control unit by one or more cables, according to a master/slave configuration. The situation is not always convenient since the data hubs may need to be powered by external power sources which requires running separate power cable to the data hub.

As a result, when designing home automated systems, there is a need to reduce the number of parts and materials within the system to make them more efficient, thereby saving space, reducing costs and providing easier installation and improved customer satisfaction. It is an object of the present disclosure to provide a system that eliminates the need for a bus power supply for data hubs of home automation systems, thereby reducing installation costs, time and materials.

SUMMARY

The present invention is directed to a data hub of a home automation system powered by a power supply of at least one powered device of the home automation system that is connected to the data hub. By providing power to the data hub from the one of the devices that are connected to it, the need for a separate power source is eliminated.

The present invention is also directed to a method for powering a data hub of a home-automation system without making use of the bus power. The data hub is powered by connecting at least two independently powered devices to device ports of the data hub. When the powered devices are connected to the ports, a voltage is detected by an internal power regulation, protection and distribution unit (IPRPDU) comprising a microcontroller of the hub and disconnects bus power.

Also provided is a system for powering the data hub by configuring the hub to receive power by devices connected thereto. When the hub receives power from the powered device, bus power is disconnected and the hub is powered by the device connected to it. Power from the device also powers a controller/keypad of the home automation system.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments that are presently preferred. It is understood, however, that the invention is not limited to the precise arrangements and instrumentalities shown. In the drawings.

DETAILED DESCRIPTION OF THE PREFERRED EMBODIMENTS

Figure 1:
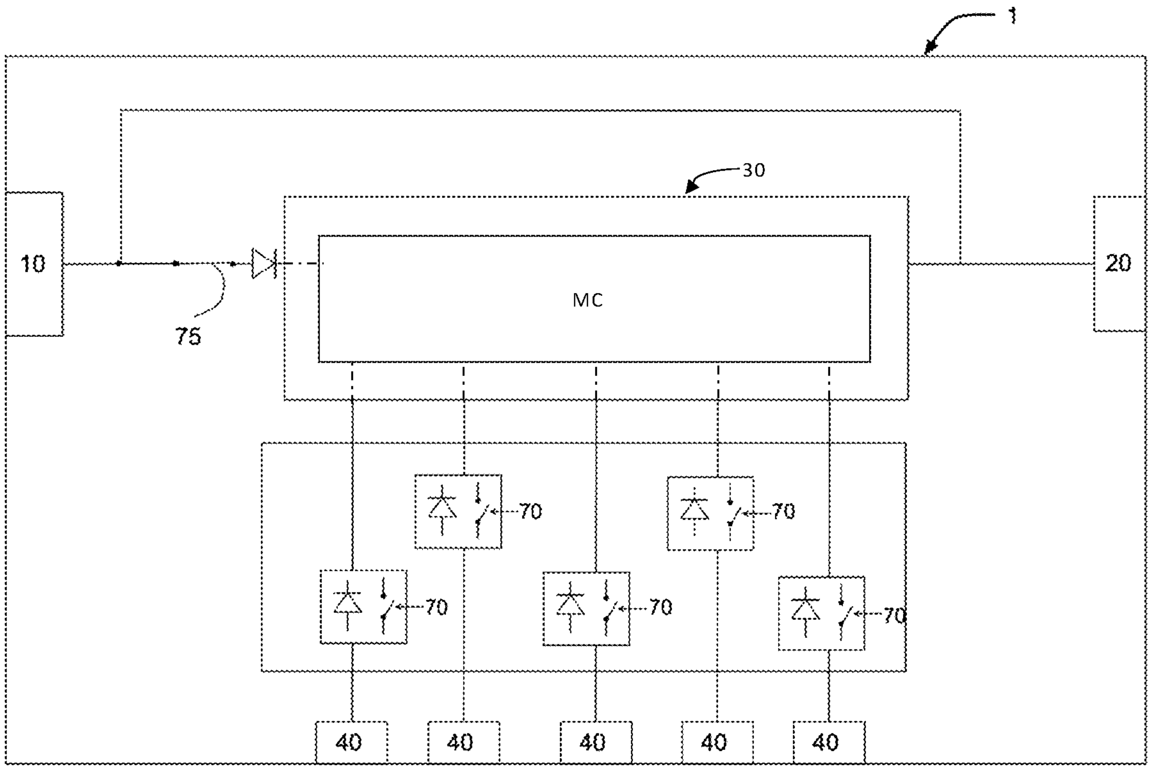
FIG. 1 is a schematic representation of the data hub of the present invention.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 depicts a data hub arrangement in which an internal power regulation, protection and distribution unit (IPRPDU) 30 comprising a microcontroller MC of hub H receives power via bus inlet port 10 through a closed switch 75. The IPRPDU 30, in turn, eventually distributes power to the device ports 40. In FIG. 1 switches 70 are open meaning that there is no bus power being provided by the IPRPDU 30 to the device ports 40 nor from the device ports 40 to the IRPDU 30. Without bus power to the IPRPDU 30, any device connected to the device ports 40 will not be powered.

Figure 2:
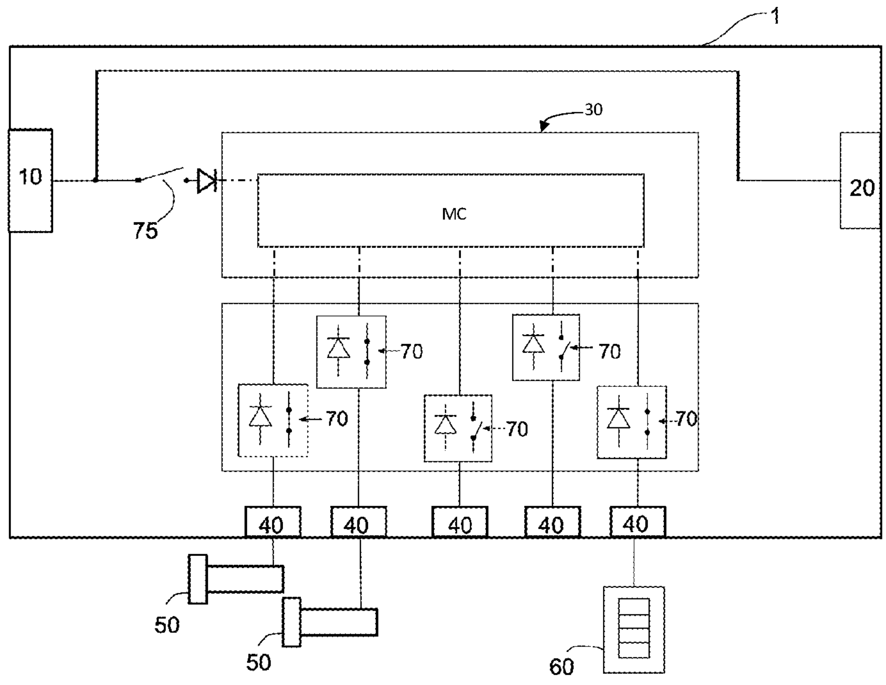
FIG. 2 is a schematic representation of the data hub of the present invention in an operative configuration.

As shown in FIG. 2, data hub 1 comprises an internal power regulation, protection and distribution unit (IPRPDU) 30, comprising a microcontroller MC, which is in turn connected to device ports 40. Device ports 40 can be any type of port that accepts a releasable connector, e.g., RJ11, RJ22, RJ45, etc. In the present system reference will be made to an RJ45, 8 wire connector. In FIG. 2, there are two independently powered devices (motors or actuators) 50 and one keypad/controller 60 connected to the IPRPDU 30 via device ports 40. Devices ports 40 accept indifferently any type of device such as independently powered device or devices dependent upon power from the data hub, such as keypads 60. The motors or actuators are configured to actuate rolling blinds, sun shades, drapes, screens, doors, etc. in a home-automation system. Power to the IPRPDU 30 can be provided either by the bus power from the bus connected to bus inlet port 10 or can be provided by the independently powered motors 50. In the latter case, the data hub in turn provides power to the keypad/controller 60. Once powered devices are connected to any of the ports 40 the IPRPDU 30 activates and determines power requirements for the system. Since in the configuration of FIG. 2, power is being provided to the IPRPDU 30 by two motors 50, it is determined that no power needs to be provided by bus inlet port 10, therefore switch 75 is open and bus power flows directly from bus inlet port 10 to bus outlet port 20.

It has been determined that at least two powered motors/actuators 50 connected to the device ports 40 provide sufficient power, e.g., 350 mW each, 30 mA at approximately 12 v, to properly operate the IPRPDU 30 and the keypad/controller 60, without the need from power from the bus. The motors/actuators 50 have their own individual mains supply and therefore power supplied by the bus is not required. In the configuration of FIG. 2, input/output lines connecting the motors/actuators 50 and keypad/controller 60 to the device ports are monitored by the microcontroller MC of the IPRPDU 30.

Figure 3:
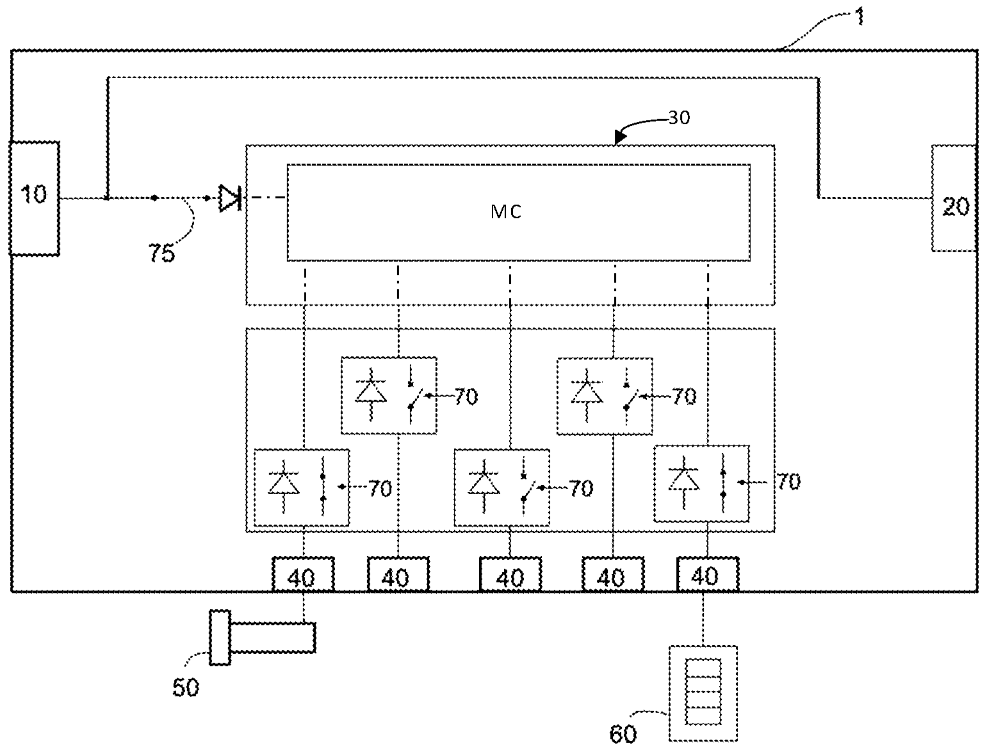
FIG. 3 is a schematic representation of the data hub of the present invention in a second operative configuration.

If the microcontroller MC determines that there is insufficient power being supplied by the motors 50, for example if only one motor 50 is connected to the data hub, switch 75 is closed and power is then provided to the IPRPDU 30 and the keypad/controller 60 by the bus inlet port 10 (FIG. 3). Once/if a second motor/actuator 50 is connected to one of the device ports 40, and the microcontroller MC determines that there is sufficient power to power the hub 1 and controller 60, the switch 75 is opened and power from the bus inlet port 10 is disconnected from the IPRPDU 30.

Figure 4:
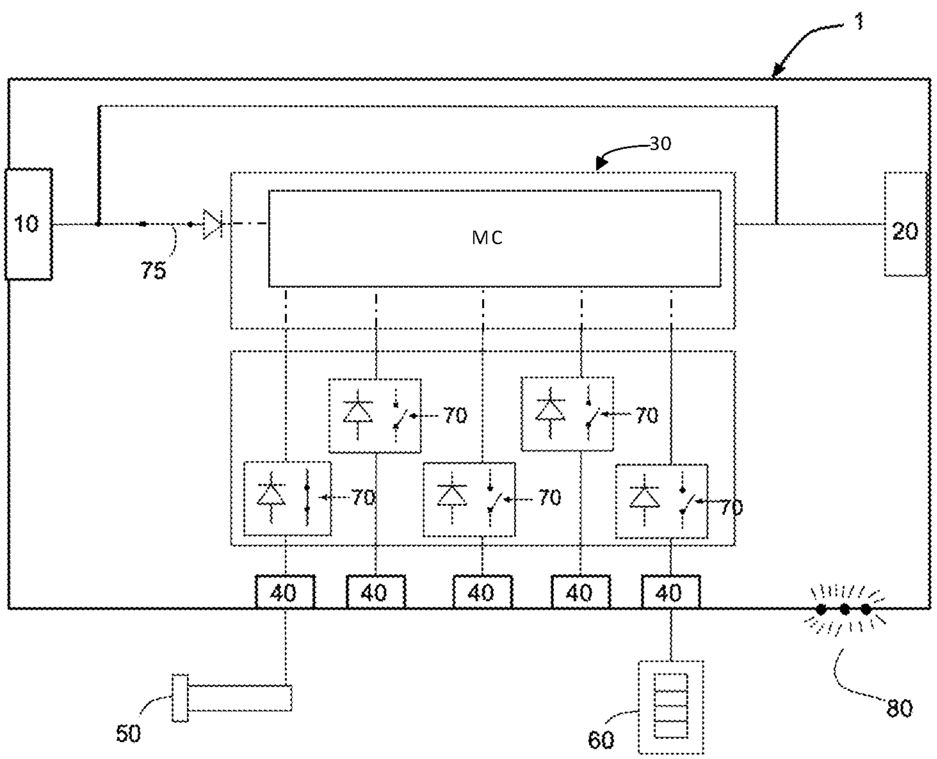
FIG. 4 is a schematic representation of the data hub of the present invention in a disabled configuration.

If the microcontroller MC determines that one of the two motors 50 powering the data hub is disconnected or out of order, its port 40 is disconnected and power is provided by bus inlet port 10. A minimum operating voltage of the device is generally 4.5 v. However, the minimum for full functionality can be set to 9 v, since cable losses at that point would make use with any lower voltage impractical as it would collapse once load was applied. The arrangement shown in FIG. 4 depicts a situation where only one motor/actuator 50 is connected to the IPRPDU 30 and the available bus power is too low compared to the power requirement determined by the microcontroller MC, which determines, via load detection, that there is insufficient voltage to power the hub. As a result, in this case, the functionality of the hub is disabled and a visual indicator, e.g., an LED or other type of illuminated light, 80 provides a visual alert to a user or installer that the system is under powered.

It is noted that load device detection is carried out via shorting pin 6 of the RJ45 connector to ground for each device connected to a port 40, whereas supply device detection is carried out via detecting voltage applied to the device port.

Switch 75 also comprises diode protection to protect bus inlet port 10 from device power feeding back to the bus inlet port 10. In addition, the device ports 40, when connected to a powered device (motor/actuator 50), are also diode protected to prevent back feeding bus power (or other powered device power) into the power device. The device ports 40 themselves are individually fused, preferably with self-resetting fuses in order to prevent drawing too much power from powered devices and to also prevent sending too much power to loads. This also prevents damage to the data hub 1 if the ports 40 are wired incorrectly. Such a miswiring situation could be determined and indicated using the visual indicator 80, to provide a visual alert to a user or installer that the system is miswired.

Figure 5:
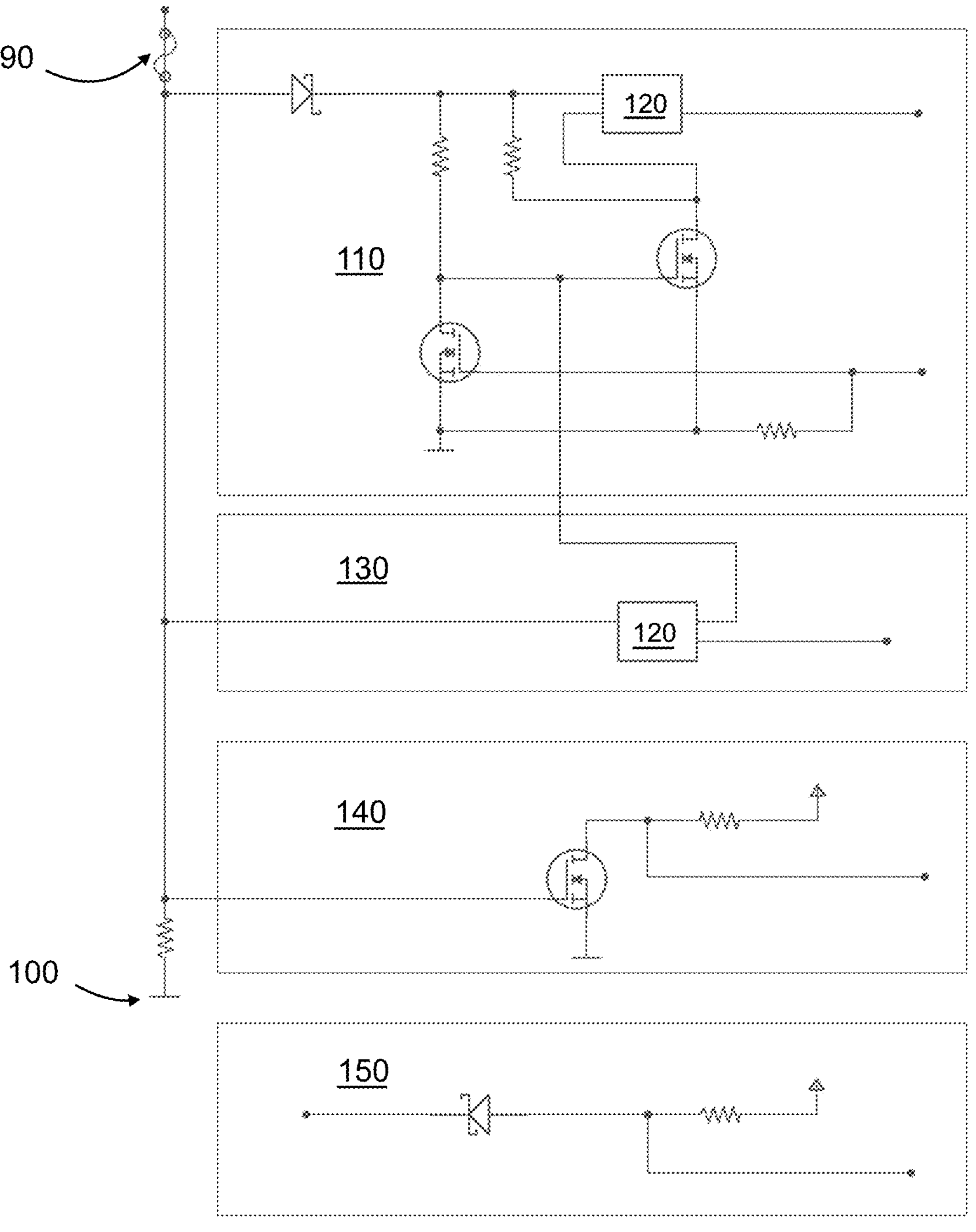
FIG. 5 is a schematic diagram of a load device detection circuit of the data hub of the present invention.

The schematic diagram of a load device detection circuit of the data hub of FIG. 5 includes: power in switch circuit 110, with P-Channel MOSFET 120; power out switch circuit 130; motor voltage detector circuit 140 and keypad/device detector circuit 150. A resettable fuse 90 is connected to pins 4 and 5 and ground 100 is connected to pins 7 and 8 of the RJ45 connector. When a keypad 60 is connected to the hub, pin 6 of the RJ45 connection is pulled to ground thereby also pulling the control line to the microcontroller of the IRPDU 30 low, signaling that an end device that needs power has been connected. Since a keypad is connected to the hub, owing to the control line to the microcontroller from the keypad/device detector circuit 150, the microcontroller turns on the P-Channel MOSFETs 120 of the Power out switch circuit 130, allowing current to flow from an internal power rail of the power out switch to the connected device. It is noted that power from the internal power rail is prevented from backfeeding out of the power in switch circuit by a diode.

Since power is being supplied to the keypad 60, the voltage output results also in a MOSFET of the motor voltage detection circuit 140 being turned on, pulling the control line to microcontroller low, which is ignored since the keypad/device detector circuit 150 is sufficient on its own in detecting a keypad 60.

When a motor 50 is connected to the hub 1, since a motor and not a keypad or other end device is connected, pin 6 is not pulled to ground and therefore the keypad/device detector circuit sends a high signal to the microcontroller. Voltage from the connected motor 50, turns on the MOSFET in the motor voltage detector circuit 140, pulling the output to the microcontroller low. Since the motor voltage detector circuit 140 pulls the control line to the microcontroller low and the control line from the keypad/device detector circuit 150 is still high, the microcontroller turns on the P-channel MOS- FET in the power in switch circuit 110 allowing power to flow from the motor to the internal power rail of the data hub. Power is prevented from backfeeding out to the motor since the P-Channel MOSFET 120 in the power out switch circuit 130 is off. The diode in the Power in switch circuit 110 and a body diode also opposes backfeeding current flow.

When no device is connected to the hub 1, in the keypad/device detection circuit 150, since no device is connected to pull pin 6 to ground, the control line to the microcontroller remains pulled high. Because no voltage is present on the device port, the MOSFET of the motor voltage detection circuit 140 is off, thereby pulling the control line to the microcontroller high. In this configuration, the P-Channel MOSFET 120 in the power in switch circuit 110 is on, which allows current to flow to the internal power rail from the device port 40 if it were present, but since it is not, voltage coming from the internal power rail is blocked by the diode. The P-Channel MOSFET 120 in the power out switch circuit 130 is off, preventing current flow from the internal power rail to the device. Current would be permitted, by the body diode, to flow from device port to the internal power rail if a device were present.

Figure 6:
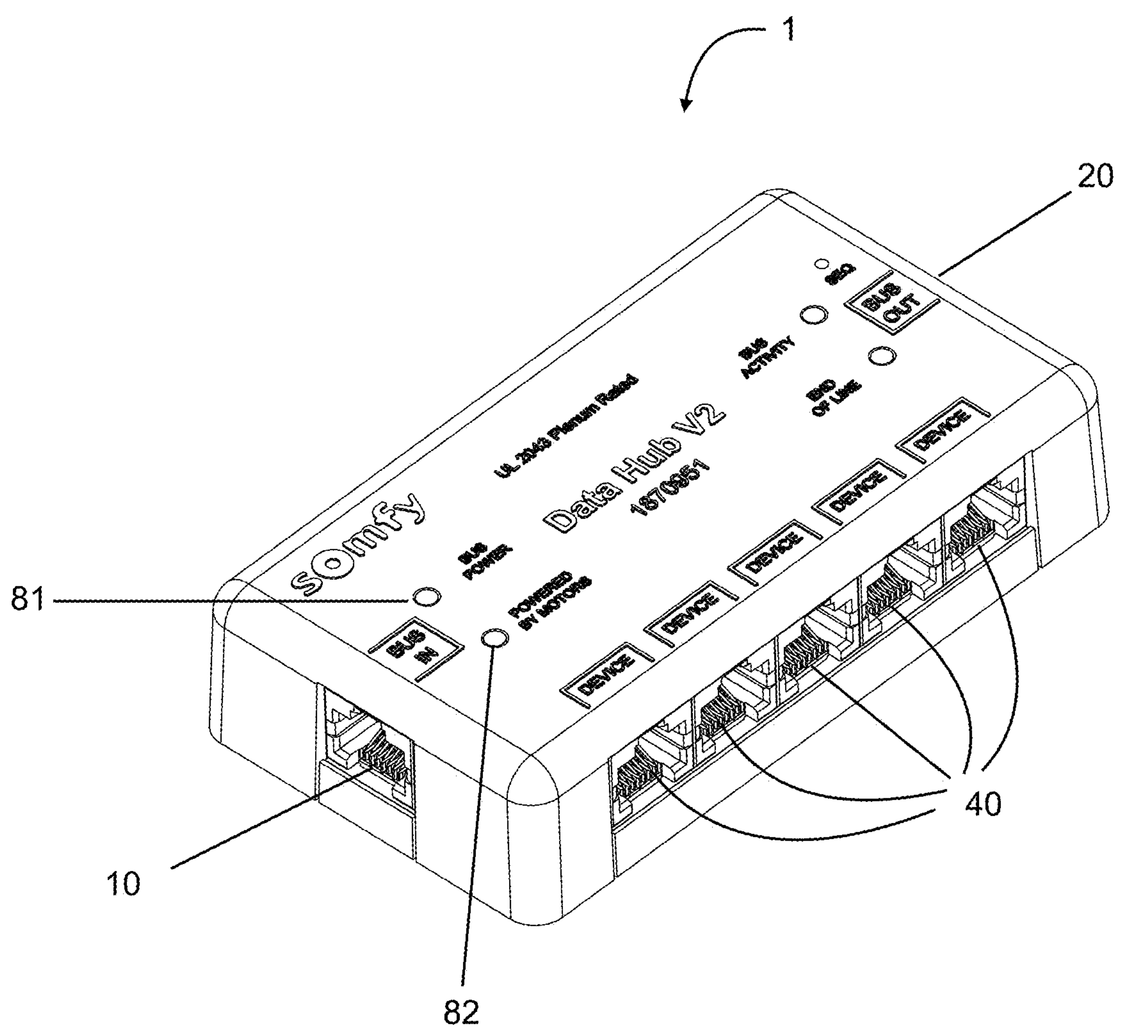
FIG. 6 is a perspective view of the data hub of the present invention.

In FIG. 6 the hub 1 is represented, in addition to bus inlet port 10, bus outlet port 20 and device ports 40, already discussed above, the hub 1 also includes indicator lights 81, 82, which indicates to a user if the hub 1 is under bus power or if it is under motor power.

A method for powering the data hub 1 of a home-automation system without bus power includes connecting at least two independently powered devices 50 to device ports 40 of the data hub. When the powered devices 50 are connected to the ports 40, a voltage is detected by the microcontroller MC disconnects bus power.

Also provided is a system for powering the data hub 1 by configuring the hub 1 to receive power by the powered motors 50 connected thereto. When the hub 1 receives power from the powered motors 50, bus power 10 is disconnected and the hub 1 is powered by the powered motors 50 connected to it. As discussed above, power from the motors 50 also powers a controller/keypad 60 of the home automation system.

It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:

1. A data hub for a home-automation system, the hub comprising:

an internal power regulation, protection and distribution unit (IPRPDU), comprising a microcontroller configured to regulate power, a plurality of device ports a bus inlet port and a bus outlet port connected to the IPRPDU, at least two powered devices, each connected to an individual power supply, and connected to the device ports such that the connection of the at least two powered devices to the device ports provides power from the individual power supply, and a switch between the bus inlet port and the IPRPDU, wherein the switch is configured to be opened if the microcontroller detects that sufficient power is being provided by the individual power supply by detecting a voltage applied to the device ports.

2. The data hub of claim 1, further comprising a keypad controller, configured to actuate the at least two powered devices, connected to one of the device ports.

3. The data hub of claim 2, further comprising a switch between each device port and the IPRPDU, the switch having an open configuration when a device is not connected to an individual port.

4. The data hub of claim 1, wherein the at least two powered devices are motors that actuate at least one of: rolling blinds, sun shades, drapes, screens, or doors.

5. The data hub of claim 1, wherein the device ports comprise self-resetting fuses.

6. The data hub of claim 1, wherein the device ports are configured as RJ45, 8-wire connector jacks.

7. The data hub of claim 1, further comprising a load device detection circuit, comprising a device detection circuit and a motor voltage detector circuit.

8. The data hub of claim 1, further comprising a visual indicator, configured to actuate if fewer than two powered devices are connected.

9. The data hub according to claim 7, wherein the load detection circuit comprises: a power in switch circuit; a power out switch circuit; a motor voltage detector circuit and keypad/device detector circuit, and wherein connecting a keypad to the hub causes a pin of a releasable connector connectable to the device port to be pulled to ground thereby also pulling a control line to the microcontroller low, signaling that an end device that needs power has been connected.

10. The data hub according to claim 9, wherein the connection of the keypad to the hub results in the microcontroller turning on the power out switch circuit, allowing current to flow from an internal power rail of the power out switch to the end device.

11. The data hub according to claim 7, wherein the load detection circuit comprises: a power in switch circuit; a power out switch circuit; a motor voltage detector circuit and keypad/device detector circuit, and wherein connecting a powered device to the hub causes sending a high signal to the microcontroller on a control line and the motor voltage detector circuit pulling an output to the microcontroller low.

12. The data hub according to claim 11, wherein the connection of the powered device to the hub results in the microcontroller turning on the power in switch circuit, allowing current to flow from the powered device to an internal power rail of the data hub.

* * * * *